United States Patent [19]

Schumacher

[11] Patent Number: 5,292,491
[45] Date of Patent: Mar. 8, 1994

[54] PROCESS FOR THE SOLVENT EXTRACTION OF PALLADIUM FROM AQUEOUS SOLUTIONS

[75] Inventor: Oliver Schumacher, Werne, Fed. Rep. of Germany

[73] Assignee: Schering Aktiengesellschaft, Bergkamen, Fed. Rep. of Germany

[21] Appl. No.: 938,215
[22] PCT Filed: Jun. 26, 1991
[86] PCT No.: PCT/EP91/01193
§ 371 Date: Oct. 16, 1992
§ 102(e) Date: Oct. 16, 1992
[87] PCT Pub. No.: WO92/01819
PCT Pub. Date: Feb. 6, 1992

[30] Foreign Application Priority Data
Jul. 14, 1990 [DE] Fed. Rep. of Germany ....... 4022472

[51] Int. Cl.$^5$ .............................................. C01G 55/00
[52] U.S. Cl. ....................................................... 423/22
[58] Field of Search ........................................... 423/22

[56] References Cited
U.S. PATENT DOCUMENTS
4,961,856 10/1990 Dalton et al. .............. 423/22

FOREIGN PATENT DOCUMENTS
0057797 8/1982 European Pat. Off. .
0112617 7/1984 European Pat. Off. .
0332314 9/1989 European Pat. Off. .

*Primary Examiner*—Wayne Langel
*Attorney, Agent, or Firm*—Scully, Scott, Murphy & Presser

[57] ABSTRACT

The invention relates to a process for the solvent extraction of palladium from aqueous solutions of palladium salts which contain nitrate ions and are essentially free of halide and pseudohalide ions, pyridinecarboxylic esters being used as the extraction medium.

10 Claims, No Drawings

PROCESS FOR THE SOLVENT EXTRACTION OF PALLADIUM FROM AQUEOUS SOLUTIONS

The invention relates to a process for the solvent extraction of palladium from aqueous solutions which contain nitrate ions, pyridine-3,5-dicarboxylic diesters being used as the extraction medium.

It is known that palladium can be removed and recovered from aqueous solutions by solvent extraction. The solvent extraction media conventionally used according to the prior art, for example dialkyl sulfides, are lacking in resistance to oxidation and can therefore not be used in an oxidizing environment (for example in nitric acid solutions); dialkyl sulfides further suffer from poor extraction kinetics.

EP-A-0,332,314 describes the solvent extraction of palladium from aqueous solutions of palladium salts which obligatorily contain halide or pseudohalide anions, using a solution of a heterocyclic compound in a water-immiscible solvent, which has at least one ring substituent of the type -COX, where X is an alkoxy group having at least 5 carbon atoms. The heterocyclic ring compound in this case can be a pyridine mono-, pyridine di- or pyridine tricarboxylic ester, for example a diester of pyridine-3,5-dicarboxylic acid. Palladium is extracted in this case from the aqueous solution containing halide or pseudohalide anions into the water-immiscible solvent, whereas the majority of the other metals remain in the aqueous solution. If copper is present, it is coextracted to a great extent and must be separated off in a separate step. The palladium is extracted from the water-immiscible solvent using an aqueous solution (strip solution).

It has now surprisingly been found that it is possible to extract palladium from solutions which are essentially free from halide and psuedohalide anions, using these heterocyclic compounds. In contrast to the teaching given in EP-A-0,332,314 "the process of the present invention is believed to proceed by the formation of a complex, for example a halogeno complex, between the palladium, or copper, salt and the substituted heterocyclic compound", with the aid of the process according to the invention, the procedure can therefore be carried out even in the absence of halide or pseudohalide anions. The extraction rate is high in this case, the palladium extraction proceeds almost quantitatively and with high selectivity over the majority of other metals; copper is not coextracted or is coextracted only in very small amounts.

The solvent extraction media used for this are described in EP-B-0 057 797.

It has been further shown that the pyridine-3,5-dicarboxylic diesters described in EP-B-0,057,797 are distinguished by a high oxidation stability and are thus suitable for use in an oxidizing environment, such as for example nitrate solutions acidified by nitric acid.

The invention thus relates to a process for the solvent extraction of palladium from aqueous solutions of palladium salts which are essentially free of halide and pseudohalide ions, comprising the following steps:

(1) contacting the aqueous, nitrate ion-containing palladium salt solution with a solution of the extraction medium in a water-immiscible organic solvent;

(2) separating the aqueous solution from the solution of the extraction medium in the water-immiscible organic solvent into which the palladium has been extracted;

(3) if required, washing the resulting organic phase with water or diluted acids to remove accompanying metals possibly coextracted in small amounts;

(4) contacting the resulting organic phase with an aqueous strip solution, the palladium transferring into the aqueous strip solution;

(5) separating the aqueous strip solution, into which the palladium has transferred, from the solution of the extraction medium in the water-immiscible organic solvent;

(6) if required, further washing of the resulting organic phase with water, dilute aqueous solutions or dilute acids prior to reuse, the extraction medium used being pyridinecarboxylic esters of the general formula (1)

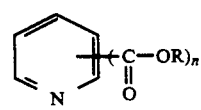

in which n=1 to 3 and R is a identical or different hydrocarbon radicals having 5-36 C atoms and where the sum of the carbon atoms of all the Rs is between 16 and 36.

The invention further relates to a process for the solvent extraction from aqueous nitrate ion-containing and halide ion-free solutions, the extraction medium used being pyridine-3,5-dicarboxylic diesters of the general formula (2)

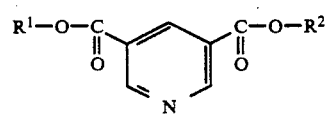

in which $R^1$ and $R^2$ are identical or different unbranched or branched-chain or mixed isomeric alkyl groups having 5 to 36 carbon atoms.

Further subjects of the invention are characterized by the claims.

The range of variation of the chain lengths of the individual R is relatively large and is limited by the industrial requirements of the extraction medium. Apart from the selectivity and an adequate extraction capacity, these requirements are essentially that the esters should first of all be adequate hydrophobicly (water insolubility) and the viscosities should be sufficiently low, at the concentrations conventionally used, to correspond to the requirements of the particular process variants.

This is generally the case if the sum of the carbon atoms of all R is between 16 and 36, individual values at n=2 or 3 preferably not undershooting a figure of 5, but in particular 8, C atoms per R.

Preference is given to compounds in which branched hydrocarbon radicals having 8 to 24, in particular 9-13 C atoms are present, such as the possibly mixed isomeric 2-ethylhexyl, octyl, nonyl, decyl, tridecyl radicals.

In the process according to the invention, very particular preference is given to the compounds in which $R^1$ and $R^2$ are identical and comprise mixed isomeric nonyl and mixed isomeric isodecyl radicals such as diisononyl pyridine-3,5-dicarboxylate and diisodecyl pyridine-3,5-dicarboxylate.

The process is particularly suitable for the solvent extraction of palladium from aqueous solutions of palladium salts which contain nitrate ions and are essentially free from halide and pseudohalide anions.

The process is, surprisingly, also suitable for the palladium extraction from silver nitrate solutions acidified by nitric acid, which are essentially free from halide and pseudohalide ions, such as are produced, for example, in the electrolytic refining of silver.

The electrolytic refining of silver by the Möbius process or related processes in which crude silver is dissolved in an $AgNO_3/NaNO_3$ electrolyte, acidified by nitric acid, and is then cathodically deposited again, is widely used for refining crude silver. During the electrolytic refining, accompanying metals such as Cu and Pd accumulate in the silver electrolyte. If the Pd concentration exceeds a critical value, the silver quality is adversely affected as a result. The electrolysis must then be terminated and the electrolyte further processed. The further processing can be conventionally carried out so that the nitrate-containing solution is evaporated and the metal nitrates are then thermally decomposed stepwise in a so-called "black melt".

Disadvantages of this procedure are a relatively long time for capital to be tied up by the noble metals, the evolution of large amounts of toxic nitrous gases and the relatively high energy consumption.

The process according to the invention overcomes these disadvantages.

The removal of palladium from silver electrolytes acidified by nitric acid with the aid of the solvent extraction process according to the invention can be carried out in such a manner that a part-stream of the palladium-containing electrolyte is constantly withdrawn from the electroysis [sic] bath, freed of palladium and returned to the process. Alternatively, the electrolysis can also be operated until the critical palladium concentration is attained and then terminated, the electrolyte then being completely freed of palladium and the resulting essentially palladium-free silver nitrate solution, acidified by nitric acid, being reused for the electrolysis.

The solvent extraction process itself contains the following part steps:

(1) contacting the aqueous, nitrate ion-containing palladium salt solution with a solution of the extraction medium in a water-immiscible organic solvent, possibly with the use of long-chain aliphatic or araliphatic alcohols as a so-called "modifier" to improve the phase separation;

(2) separating the aqueous solution from the solution of the extraction medium in the water-immiscible organic solvent into which the palladium has been extracted;

(3) if required, washing the resulting organic phase with water or dilute acids, preferably dilute nitric acid, to remove accompanying metals possibly coextracted in small amounts;

(4) contacting the resulting organic phase with an aqueous strip solution, the palladium transferring into the aqueous strip solution, for example with thiourea solutions or with dilute solutions of alkali metal hydroxides, but preferably with dilute aqueous ammonia solution;

(5) separating the aqueous strip solution, into which the palladium has transferred, from the solution of the extraction medium in the water-immiscible organic solvent;

(6) if required, washing the resulting substantially palladium-free, organic phase with water, dilute aqueous solutions or dilute acids, preferably dilute nitric acid, to remove foreign substances carried over from the strip solution.

The pyridine-3,5-dicarboxylic diesters used as the extraction medium can be used at concentrations of 0.1 to 2 mol/l, preferably at concentrations of 0.2 to 0.8 mol/l, particularly preferably at concentrations of approximately 0.2 to 0.3 mol/l dissolved in water-immiscible organic solvents or diluents (these solutions are termed "the organic phase" below).

Examples of suitable solvents are aliphatic, aromatic and araliphatic hydrocarbons, chlorinated hydrocarbons or mixtures of such solvents. In hydrometallurgical practice, particular preference is given to hydrocarbon mixtures such as high-boiling mineral oil fractions (for example kerosene) having a high flash point and various contents of aromatic compounds, such as are commercially available for example under the names ESCAID ®, SOLVESSO ® (trademarks of ESSO) or SHELLSOL ® (trademark of SHELL). In the process according to the invention, solvents having average contents of aromatic compounds (such as for example SHELLSOL ® 2046) generally showed a better hydrometallurgical behavior, for example better phase separations, than those having particularly low (for example SHELLSOL ® EC 707) or particularly high (for example SOLVESSO ® 15[illegible]) contents of aromatic compounds.

Depending on the characteristics of the acidic, nitrate ion-containing palladium salt solution, the addition of so-called "modifiers" to the organic phase can possibly be advantageous. Suitable "modifiers" are for example water-insoluble aliphatic or araliphatic, unbranched or branched alcohols, for example isodecanol, isotridecanol or nonylphenol. Such "modifiers" can contribute to improving the separation of the organic phases from the aqueous phases, but in the process according to the invention they can also slightly interfere with the reextraction of the palladium from the organic phase. However, such an addition is generally not necessary.

The entire extraction process (Stages 1-6) can be carried out by the processes generally known in this area.

However, the extraction (1) is expediently carried out in such a manner that the aqueous nitrate anion-containing palladium salt solution (hereinafter termed "the feed") is intimately mixed with the organic phase in a mixing vessel (the so-called "mixer"). Phase ratios of 0.1-20 parts by volume of the aqueous feed per 1 part by volume of organic phase are expedient; those of 1-10:1 are preferred. The particular optimum phase ratio can be derived for a given case from the requirement that at least about 2 mol of the extraction medium should be present for each mole of palladium to be extracted. The contact times can be 0.5-30 minutes, preferably 2 minutes.

For the separation (2) of the aqueous solution from the palladium-charged organic phase, the phases are settled in a settling vessel (the so-called "settler"). In general, and also in all of the operations described below, the phase separations are rapid and complete. If required, they can be improved by physical coalescence aids, so-called "coalescers", by passing the mixtures of aqueous and organic phases through, for example, glass wool or perforated screen plates.

Washing (3) of the palladium-charged organic phase is generally not required, but can be undertaken to remove the small quantities of coextracted accompanying metals. By this means, the purity of the palladium is increased and interferences in the following process steps are avoided.

The washing can be carried out using water or dilute acids, in particular mineral acids, preferably dilute nitric acid. The use of dilute acids is particularly recommended if the coextracted accompanying metals have a tendency to precipitate out as a result of hydrolysis on elevation of the pH.

Phase ratios of 0.5-2, preferably 0.5 parts by volume of washing solution per 1 part by volume of organic phase and contact times of 1-10 minutes, preferably 2-5 minutes have proven to be sufficient. Washing can be carried out in one stage, or, if required, can be repeated several times, but a single washing is generally sufficient.

The reextraction (stripping) (4) is carried out by intimate mixing of resulting palladium-charged organic phase with an aqueous strip solution in a mixing vessel, as described above under (1). In this case the palladium transfers into the aqueous strip solution.

Suitable strip solutions are for example dilute thiourea solutions, dilute aqueous solutions of alkali metal hydroxides and, in particular, dilute aqueous ammonia solutions. Preference is given to dilute aqueous ammonia solutions having contents of 1-4% of $NH_3$ (for example 1 normal $NH_3$); higher $NH_3$ concentrations do indeed improve the reextraction of the palladium, but contribute to the impairment of the phase separation. For more complete palladium reextraction, it is recommended to carry out the reextraction in a plurality of stages, preferably in 2-4 stages, the aqueous phase being contacted in each case with fresh aqueous strip solution. Contact times of 1-10 minutes, preferably 2-5 minutes are generally sufficient. Phase ratios of 0.5-2 parts by volume, preferably 1 part by volume of aqueous strip solution per 1 part by volume of organic phase have proven to be sufficient.

For the separation (5) of the palladium-charged strip solution from the organic phase, the statements made above under (2) (essentially) apply.

A further washing (6) of the essentially palladium-free organic phase prior to its reuse for the palladium extraction is always advisable if no foreign substances are to be carried over from the aqueous strip solutions (for example $NH_3$ or thiourea) into the feed to be treated. This is the case, for example, with silver nitrate electrolytes, acidified by nitric acid, from silver refining.

Suitable washing fluids are water or dilute aqueous solutions, rather, for the removal of $NH_3$, dilute acids, preferably dilute nitric acid.

The washing can be carried out in one or more stages, but generally a single washing is sufficient.

The individual steps of the process can be carried out at temperatures up to 60° C., but preferably at room temperature.

EXAMPLES

Preparation of diisodecyl pyridine-3,5-dicarboxylate (Example 11 EP-A 0 057 797)

A mixture of 83.6 g of pyridine-3,5-dicarboxylic acid, 1.25 g of dimethylformamide and 50 g of toluene were heated up to 80° C. with vigorous stirring in a 3-necked flask, equipped with stirrer, thermometer, dropping funnel and reflux condenser and 131 g of thionyl chloride were then added dropwise in the course of 1 hour. After completion of the addition, reaction was continued for 4 hours at 80°-82° C. The excess thionyl chloride was distilled off, 158.3 g of isodecanol (commercial product from ICI Petrochemical Division) were added at 80°-85° C. in the course of 30 minutes and the reaction mixture was stirred intensively at this temperature for 2 hours. The mixture was then cooled to room temperature and successively washed using 400 ml of a 20% strength aqueous NaOH solution, 1M hydrochloric acid, 0.5M hydrochloric acid and water and then further treated with activated charcoal (approximately 8% by weight relative to the reaction product). After the toluene had been removed under reduced pressure, the residue was distilled at 0.1 mbar and 200°-210° C. The purity of the product was 97%.

PREPARATION OF THE EXTRACTION SOLUTION

By dissolving diisodecyl pyridine-3,5-dicarboxylate in SHELLSOL ® 2046 (a mineral oil fraction having approximately 16% aromatic compounds fraction), an organic solution was prepared having a concentration of 111.5 g of diisodecyl pyridine-3,5-dicarboxylate per liter, corresponding to approximately 0.25 mol per liter. The ester had been prepared according to the process described. This organic solution was used in the following examples.

EXAMPLE 1

This example demonstrates the extraction of palladium from a nitric acid solution.

30 ml of an aqueous palladium salt solution containing 10.96 g/l of $Pd^{2+}$ (corresponding to 0.103 mol/l) and 0.1N $HNO_3$, and 10 ml of the extraction solution are placed in a mixing vessel. The solutions are mixed with each other at room temperature for 30 minutes. After completion of the mixing process, the phases are separated from each other and the palladium uptake of the organic phase is determined in accordance with DIN 38406 Part 22.

The uptake is 12.9 g of palladium per liter of organic extraction medium solution, corresponding to a capacity of 116 g of Pd per Kg of the extraction medium. Therefore approximately 0.49 mol of Pd was extracted per mol of extraction medium used.

EXAMPLE 2

This example demonstrates the stability of the extraction medium used in a nitrate solution acidified by nitric acid.

100 ml of an aqueous solution, containing 0.1N $HNO_3$ and 0.5N $NaNO_3$ and 100 ml of the extraction solution were placed in a mixing vessel and mixed together at room temperature. After 2 days, the mixing process is interrupted, the phases separated from each other and a sample withdrawn from: the organic phase. The mixing process is then continued for a further 22 days; a further sampling is subsequently carried out. The palladium capacity of the samples withdrawn from the organic phase after 2 and 24 days is determined as described in Example 1.

During the study period, no decrease in capacity of the extraction medium was found:

| | Palladium capacity | |
|---|---|---|
| Days | g Pd/l of organic phase | g Pd/kg of extraction medium |
| 0 | 13 | 117 |
| 2 | 14 | 126 |
| 24 | 15 | 134 |

EXAMPLE 3

This example demonstrates the selective extraction of palladium from a silver nitrate solution acidified by nitric acid.

50 ml of extraction solution and 150 ml of an aqueous silver nitrate solution, acidified by nitric acid, containing 99±2 g of $Ag^+/l$, 2.2 g of $Pd^{2+}/l$, and approximately 15 g of $HNO_3/l$ were mixed together in a mixing vessel at room temperature for 30 minutes. The phases were then separated and the metal contents of the aqueous phase were measured again. There remained in the aqueous phase 100±2 g of Ag/l and 16 ppm of Pd.

The palladium has therefore been almost quantitatively extracted, at a high selectivity over Ag.

EXAMPLE 4

This example demonstrates the selective extraction of palladium from a used silver electrolyte, acidified by nitric acid, from silver refining.

200 ml of an extraction solution and 1200 ml of a used silver electrolyte, acidified by nitric acid, from silver refining, having an $HNO_3$ content of approximately 13.8 g/l, were mixed together in a mixing vessel at room temperature. The mixing process was interrupted after 2 minutes and a sample was withdrawn from the aqueous phase. Mixing was then continued for 3 minutes and the mixing process was terminated after a total of 5 minutes. The phases were separated and the metal contents of the aqueous phases compared before and after the extraction.

| | Metal contents of the aqueous phases | | |
|---|---|---|---|
| Metal | Before extraction | after 2 minutes | after 5 minutes |
| Pd | 1.4 g/l | 8 ppm | 8 ppm |
| Ag | 49 ± 2 g/l | 48 ± 2 g/l | 51 ± 2 g/l |
| Cu | 47 ± 2 g/l | 46 ± 2 g/l | 46 ± 2 g/l |
| Pb | 1.1 g/l | 1.1 g/l | 1.1 g/l |
| Ni | 1.7 g/l | | |
| Cd | 1.9 g/l | | |
| Zn | 2.1 g/l | | |

The palladium has therefore been virtually quantitatively extracted even after 2 minutes, at a high selectivity over Ag, Cu and Pb.

EXAMPLE 5

This example demonstrates the recovery of palladium from a palladium-charged extraction medium phase.

(a) Washing: 200 ml of the palladium-charged organic phase from Example 4, containing approximately 8.4 g of Pd/l, were mixed in a mixing vessel with 100 ml of 0.22 N $HNO_3$ at room temperature for 2 minutes. The phases were separated and the metal contents of the aqueous phase were determined.

(b) Reextraction: The washed organic phase (200 ml) and 200 ml of 1N $NH_3$ as aqueous strip solution were mixed for 5 minutes at room temperature in a mixing vessel, then the aqueous phase was separated off and its metal contents were determined.

This procedure was repeated twice more using fresh 1 N $NH_3$.

| | Metal contents of the aqueous phases (in ppm) | | | |
|---|---|---|---|---|
| | | | Reextraction | |
| Metal | Washing | 1st Stage | 2nd Stage | 3rd Stage |
| Ag | 285 | 2 | <1 | <1 |
| Pb | <1 | 4 | <1 | <1 |
| Pd | <1 | 6500 | 1100 | 146 |
| Cu | 0.7 | <0.2 | <0.2 | <0.2 |
| Ni | <1 | <1 | <1 | <1 |
| Cd | <1 | <1 | <1 | <1 |
| Zn | <1 | <1 | <1 | <1 |

This corresponds to a reextraction of palladium of approximately 77.7% after the first, 90.8% after the second and 92.6% after the third stage. The palladium is recovered in high purity

EXAMPLE 6

200 ml of the organic phase resulting from Example 5, substantially freed from palladium, were washed, as described in Example 5, using 200 ml of 0.22N $HNO_3$. The washing procedure was repeated until ammonium ions were no longer detectable in the washing solution.

The extraction was then, as described in Example 4, repeated from a further 1,200 ml of the used silver electrolyte, acidified by nitric acid, from silver refining. The Pd content of the aqueous phase was reduced in this case from 1.4 g/l to 7 ppm.

200 ml of the resulting organic phase, charged once more with approximately 8.4 g of palladium/l, were washed using 100 ml of 0.22N $HNO_3$ as described in Example 5.

The washed organic phase was divided. 40 ml samples of the palladium-charged organic phase were mixed for 5 minutes at room temperature with the following aqueous strip solutions in a mixing vessel: (a) 40 ml of 1N NaOH, (b) 40 ml of 5N $NH_3$, (c) 500 ml of 0.1N thiourea solution in 0.2N HCl. The phases were then separated and the metal contents of the aqueous phases and the palladium reextraction were determined in accordance with DIN 38406 Part 224.

| Strip solution | Pd content of the strip solutions | Pd reextraction |
|---|---|---|
| 1N NaOH | 0.58 g/l | 7% |
| 5N $NH_3$ | 5.6 g/l | 67% |
| 0.1N thiourea dissolved in 0.2N HCl | 0.48 g/l | 71% |

I claim:

1. Process for the solvent extraction of palladium from aqueous solutions of palladium salts which contain nitrate ions and are essentially free of halide and pseudohalide ions, comprising the following steps:

(1) contacting the aqueous, palladium salt-containing solution with a solution of an extraction medium in a water-immiscible organic solvent;

(2) separating the aqueous solution from the solution of the extraction medium in the water-immiscible organic solvent into which the palladium has been extracted;

(3) contacting the resulting organic phase with an aqueous strip solution, the palladium transferring into the aqueous strip solution;

(4) separating the aqueous strip solution, into which the palladium has transferred, from the solution of the extraction medium in the water-immiscible organic solvent;

the extraction medium used being pyridinecarboxylic esters of the general formula (1)

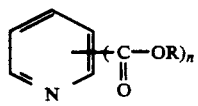

in which $n = 1$ to 3 and R is identical or different hydrocarbon radicals having 5–36 C atoms and where the sum of the carbon atoms of all the Rs is between 16 and 36.

2. Process according to claim 1, where the extraction medium used is a pyridine-3,5-dicarboxylic ester of the general formula (2)

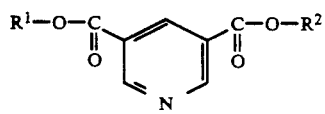

in which $R^1$ and $R^2$ are identical or different unbranched or branched-chain or mixed isomeric alkyl groups having 5 to 36 carbon atoms.

3. A process according to claim 2, where the pyridine-3,5-dicarboxylic diester used is diisodecyl pyridine-3,5-dicarboxylate.

4. Process according to any one of claims 1 to 3, where water-insoluble, unbranched or branched aliphatic or araliphatic alcohols having 8–15 carbon atoms are further added to the solution of the extraction medium in a water-immiscible organic solvent.

5. Process according to claim 4, where the aqueous strip solution used in Step (3) is a dilute aqueous ammonia solution, a dilute alkali metal hydroxide solution or a dilute thiourea solution.

6. Process according to claim 5, where the aqueous strip solution used in Step (3) is a dilute aqueous ammonia solution having a content of 1–4% of $NH_3$.

7. Process according to claim 6, where the palladium-containing organic phase resulting from Step (2) is subjected to a washing with water or dilute acids.

8. Process according to claim 7, where the organic phase resulting from Step (4) is washed with water, dilute aqueous solutions or dilute acids prior to its reuse for Step (1).

9. Process according to claim 8, where the washing liquid used is nitric acid.

10. Process according to claim 1, wherein the aqueous, palladium salt-containing solution comprises a silver nitrate solution acidified by nitric acid.

* * * * *

UNITED STATES PATENT AND TRADEMARK OFFICE
CERTIFICATE OF CORRECTION

PATENT NO. : 5,292,491
DATED : March 8, 1994
INVENTOR(S) : Oliver Schumacher

It is certified that error appears in the above-indentified patent and that said Letters Patent is hereby corrected as shown below:

On the Title Page, Section [73]: "Schering Aktiengesellschaft" should read --Witco GmbH--
Column 1, line 38: "psuedohalide" should read --pseudohalide--
Column 2, line 25: delete "a"
Column 6, line 61: delete ":"
Column 8, line 19: after "purity" insert --.--
Column 8, line 44: "224" should read --22--

Signed and Sealed this

Twentieth Day of September, 1994

Attest:

BRUCE LEHMAN

*Attesting Officer*   *Commissioner of Patents and Trademarks*